United States Patent [19]
Kamer

[11] 3,830,100
[45] Aug. 20, 1974

[54] STRAIN GAUGE TRANSDUCER TRANSIENT VOLTAGE PROTECTION

[75] Inventor: Donald Kamer, Oxnard, Calif.

[73] Assignee: Statham Instruments, Inc., Oxnard, Calif.

[22] Filed: Feb. 22, 1973

[21] Appl. No.: 334,678

[52] U.S. Cl.................... 73/88.5 SD, 73/398 AR
[51] Int. Cl............................................. G01l 1/22
[58] Field of Search ... 73/88.5 R, 88.5 SD, 398 AR; 324/110

[56] References Cited
UNITED STATES PATENTS

| | | | |
|---|---|---|---|
| 2,079,485 | 5/1937 | Bousman | 324/110 X |
| 2,507,501 | 5/1950 | Clark | 73/398 AR X |
| 2,976,462 | 3/1961 | Miller | 324/110 UX |
| 3,426,274 | 2/1969 | Wise | 324/110 X |
| 3,621,285 | 11/1971 | Anderson et al. | 73/88.5 R |

*Primary Examiner*—Charles A. Ruehl

[57] ABSTRACT

This invention relates to transient high voltage protection devices for bonded filament strain gauges.

4 Claims, 6 Drawing Figures

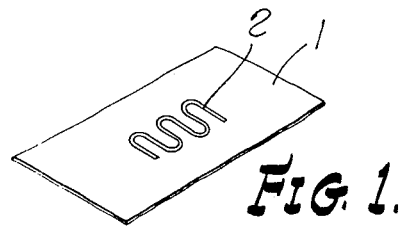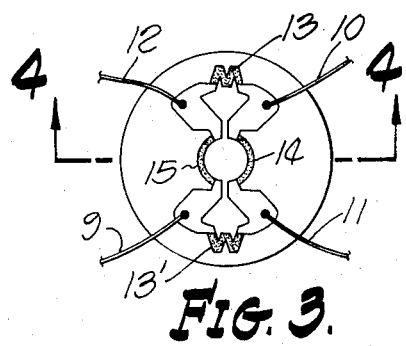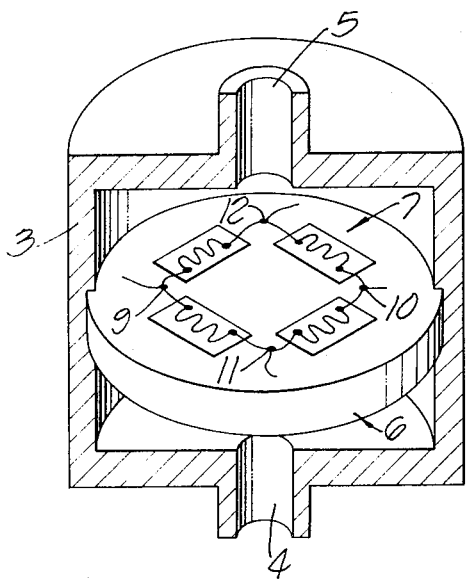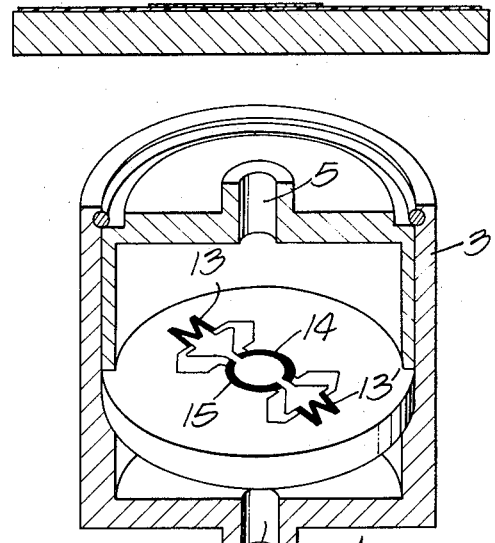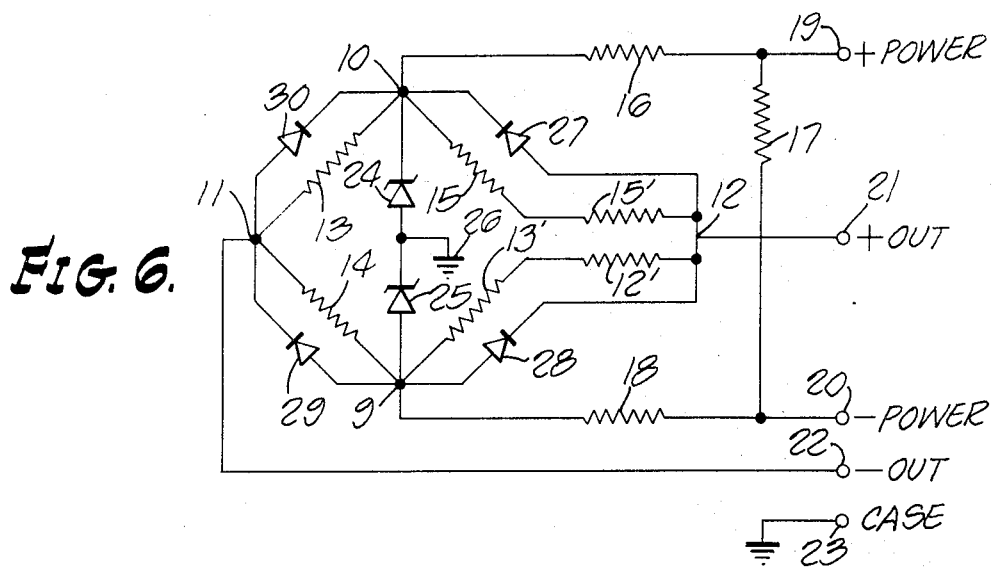

STRAIN GAUGE TRANSDUCER TRANSIENT VOLTAGE PROTECTION

BACKGROUND OF THE INVENTION

Bonded strain gauges of filament type, that is, strain wire type or film type are applied to many types of transducers formed by mounting strain elements in the form of electrically conductive filaments either of wire, foil, or deposited film, insulated from the base, usually electrically conductive, whose strain is to be reported by a change in resistance of the filament. These are of the unbonded or bonded type. The latter type is illustrated by well known SR gauges which are constructed from a filament of wire or foil mounted on an insulating membrane which is cemented to the force summing means whose strain is to be sensed by the strain gauge. Another type of bonded strain gauge is formed by depositing an insulating layer on the force summing means and depositing on the insulated layer a characterized film in the form of resistor or resistor assembly which is to act as the gauge.

One form of such gauge includes the insulating substrate formed of silicon monoxide deposited on a force summing means from the vapor of the silicon monoixde in vacuum and depositing on the silicon monoxide a film of metal alloy through a mask to form the characterized resistor in the design desired. Reference may be made to the December 1965 issue of Instrument and Control Systems to the article entitled, "Thin Film Strain-Gauge Transducers," by Peter R. Perino.

Usually the strain elements are arranged in the Wheatstone bridge array on the force summing means with electrical conductors connected to the corners of the bridge. These gauges and the force summing means are mounted in an enclosure which is usually metallic and is grounded or forms the ground.

For many uses when the transducer may be subjected to high voltage imposed on the case or the connecting cables as, for example, during lightning strikes, the transducers are frequently subject to damage. The transducer casing and cable shield are above ground potential as a result of conductive currents from the point of application of the lightning strike and also by current flow by electromagnetic induction and electrical companion current paths into the cable shield and case. The voltage induced on the transducer casing and cable shield is capacitatively coupled to the transducer strain gauge bridge. Since the capacitance from each bridge terminal and cable leads are not identical, excessive differential voltage results across the elements. Additionally, excessive voltage between the case and bridge causes breakdown of the thin insulation layer, for example, the silicon monoxide layer referred to above.

STATEMENT OF THE INVENTION

I have solved the above problem by limiting the permissible voltage difference between the corners of the bridge to less than the breakdown potential of the insulating substrate and the voltage difference across each leg to less than that which would damage the legs.

This invention will be further described by reference to the figures of which

FIG. 1 illustrates a wire or foil strain element suitable for mounting as a gauge.

FIG. 2 illustrates a schematic sectional view of a bonded gauge employing the form of FIG. 1 mounted on a force summing means subject to deflection by some force, for example, pressure.

FIG. 3 shows a schematic view of a deposited film gauge mounted on the substrate.

FIG. 4 shows a section through FIG. 3 taken on line 4—4 of FIG. 3.

FIG. 5 shows such a gauge mounted in a case to form a transducer, for example, a pressure transducer.

FIG. 6 is a schematic circuit diagram of the application of the protection circuit to transducers, for example, those shown in FIGS. 2 and 5.

In FIG. 1, 1 is a insulating layer such as, for example, cigarette paper to which a wire, in bent form is cemented at 2. 3 is a case, for example, the case of a pressure transducer to measure pressure introduced through the inlet 4 which is measured either as an absolute gauge or measured as a differential gauge against pressure introduced through 5. The diaphragm 6 is suitably supported in case 1 by a conventional means. The SR gauge of FIG. 1 is cemented on the metallic diaphragm 6 in a Wheatstone bridge array shown at 7, for example, the gauge is energized at the corners 8 and 9 from suitable power source and the output is taken at the corners 10 and 11 through suitable connections not shown since these are conventional. These electrical connections are as conventional insulated from the diaphragm and case.

A gauge such as shown in FIG. 3 is described in the Perino article referred to above and the strain elements are shown at 13' and 13 and at 14 and 15 and is a well known article of commerce. The input connections 9 and 10 are shown at 9 and 10 of FIG. 3 and the output of the gauge is shown at 11 and 12 similar to those shown in FIG. 2.

FIG. 5 illustrates the transducer positioned in a case similar to that in FIG. 4 and numbered in the same manner.

FIG. 6 illustrates the application of the protective circuit of my invention to the strain gauge transducers and is illustrated, for example, as applied to the form shown in FIG. 3. It will be understood that it may also be applied to the form shown in FIG. 2 or any other form of bonded strain gauge transducers.

As shown in the FIG. 6 the resistors of the bridge 13', 13, 14, and 15 are connected in Wheatstone arrangement with the conventional trim and pad resistors 12' and 15' 16, 17, and 18. The power input is at 19 and 20. The output is taken at 21 and 22 connected to the corners of the bridge at 11 and 12. The case 6 is connected to the ground at 23 and may constitute the ground 26.

A Zener diode 24 is connected to the corner 10 and to the ground at 26, and a Zener diode 25 is connected to the corner 9 and to the ground at 26. Four high-speed diodes 30, 29, 27, and 28 are connected in parallel with arms 13, 14, 15, and 15', and 13' and 12', respectively between the corners 11 and 10, 11 and 9, 9 and 12, and 10 and 12. The diodes are mounted on the diaphragm 6 close to the bridge elements so as to provide the shortest practical lead lengths from thin film bridge elements to the protection circuit. The purpose of this method of mounting is to reduce the lead lengths so as to provide as fast a rise time such that the physical separation between the bridge elements and protection circuit should be small compared to the transient component wave length in order to preclude significant standing waves. Transient voltages coupled to the leads 19 and 20 are clamped to the Zener voltage by the high-speed Zener diodes 24 and 25. Transient voltages applied to leads 21 and 22 are clamped to the Zener voltage within the forward diode voltage drops.

The current path clamping action is a function of the polarity of the transient.

Positive transients on leads 21 and 22 are clamped through the forward biased diode 30 connected between the terminals 10 and 11 and diode 27 between 10 and 12 respectively and clamped to ground at 26 by diode 24.

Negative transients on leads 21 and 22 are likewise clamped to the Zener 25 through the forward biased diode 28 connected between the terminals 20 and 21 at the corners 9 and 12, and the forward biased diode 29 connected between the corners 9 and 11.

The operation of the circuit as described above insures that the voltage between 19 and 20 and the case cannot exceed the Zener voltage. The diode matrix insures that the voltage from the terminals 21 and 22 to the case cannot exceed the Zener voltage because of the forward diode voltage drop. Additionally, the voltage across any element of the bridge cannot exceed the forward biased diode voltage drop. Hence, by appropriate selection of the Zener voltage and diodes, the bridge circuit is protected from both failure modes of excessive voltage across an element of the bridge and the excessive voltage across the thin film insulating layer cannot become excessive so as to injure the transducer. The normal bridge operation is not influenced by circuit described.

For example, and not as a limitation, in a bonded vacuum deposited film bridge on a silicon monoxide film dielectric substrate the maximum safe voltage across the thin film dielectric is, for example, about 50 volts; and if this is exceeded, it will cause dielectric breakdown. The characteristic safe leg voltage of such transducers is about 7.5 volts. Due to the difference of the capacitance from each bridge leg to the case, the transient voltage resulting at each of the bridge corners is of different magnitude. Since transient voltage is unprotected systems, for example, may rise to in excess of 250 volts between the bridge and the case causing breakdown of the dielectric and due unbalance capacitive coupling, cause as much or more than 50 volts to be applied across a bridge leg, clearly exceeding the maximum safe leg voltage of 7.5 volts, causing failure of the bridge legs, my invention protects the transducer by limiting any transient voltage to a safe lower voltage. The Zener diode voltage of 15 volts from corners 10 and 9 will limit the transient voltage to 15 volts which is well below the maximum safe thin film dielectric voltage of 50 volts.

The voltage drop from the corner 10 to the corner 11 and from the corner 12 and from the corner 9 is clamped to less than 1 volt which is the forward bias voltage drop of the protective diodes, which is well below the maximum safe leg voltage of 7.5 volts.

While I have described the system as applied to a four legged bridge, it will be understood that it may also be applied to a two legged or three legged bridge, where the additional legs may be positioned outside the case and may or may not be connected to parallel diodes.

I claim:

1. A transducer, including an electrically conductive case, a force summing means mounted in said case, a plurality of bonded strain filaments mounted on said force summing means, an insulation layer between said filaments and said force summing means, said filaments connected into a Wheatstone bridge array, power input connections connected to opposite corners of the bridge and output connections connected to the other corners of said bridge, a Zener diode connected to one input connection and to the case and another Zener diode connected to the other input connection and to the case and a diode connected between the ends of each filament forming a leg of said bridge and bonded to said force summing means.

2. The transducer of claim 1 in which there are four filaments mounted on said force summing means and connected into a Wheatstone bridge array.

3. The transducer of claim 1 in which the insulating layer is a silicon monoxide layer and the filaments are film deposited metallic resistors on said silicon monoxide layer.

4. The transducer of claim 3 in which there are four filaments mounted on said force summing means and connected into a Wheatstone bridge array.

* * * * *